Jan. 21, 1969     K. P. DIMICK ET AL     3,423,181
THERMIONIC DETECTOR FOR GAS CHROMATOGRAPHY
Filed June 6, 1966
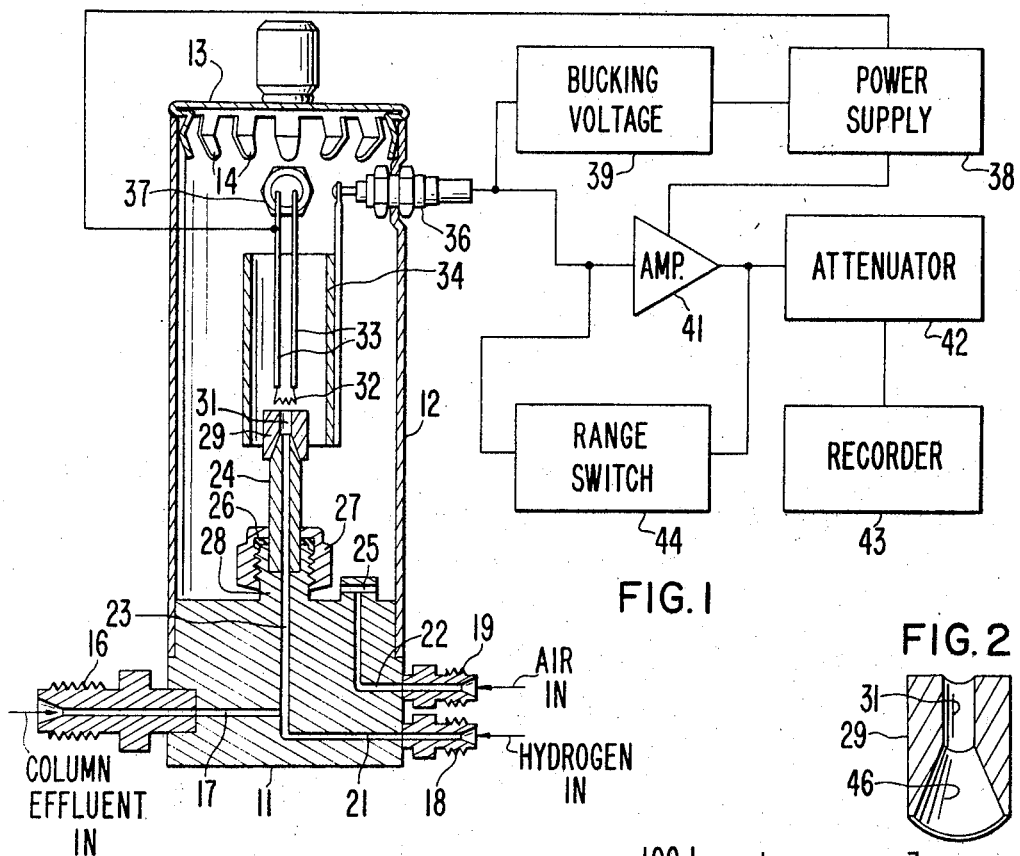
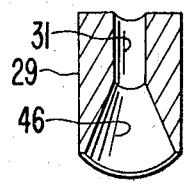
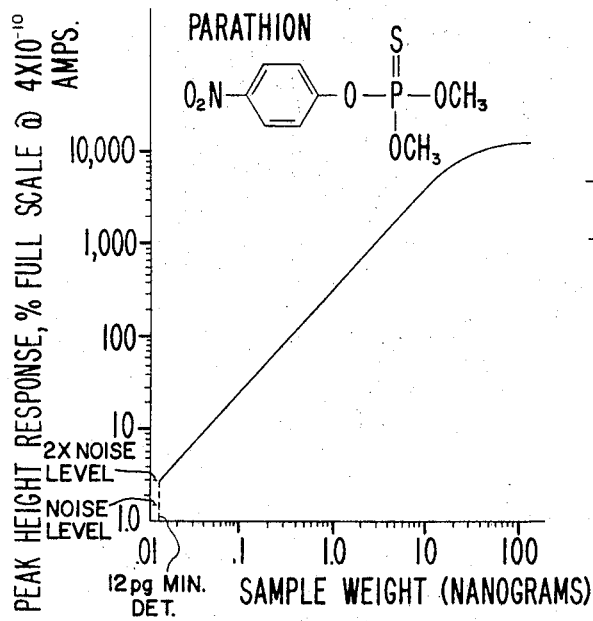
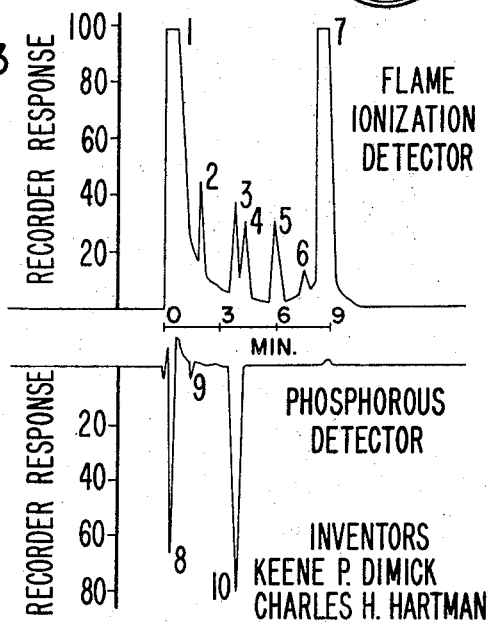
INVENTORS
KEENE P. DIMICK
CHARLES H. HARTMANN
DUDLEY M. OAKS, JR.
ELMER TRONE
BY
ATTORNEY 3,423,181
THERMIONIC DETECTOR FOR GAS CHROMATOGRAPHY
Keene P. Dimick, Santa Rosa, Charles H. Hartmann, Moraga, Dudley M. Oaks, Jr., Oakland, and Elmer Trone, Benicia, Calif., assignors to Varian Associates, Palo Alto, Calif., a corporation of California
Filed June 6, 1966, Ser. No. 555,607
U.S. Cl. 23—254     6 Claims
Int. Cl. G01n 31/12

This invention relates generally to gas chromatography detectors and, in particular, to an improved thermionic detector incorporating a novel ion source.

The flame ionization detector (FID) is commonly used as an "all purpose" detector in gas chromatography. In the operation of the FID, effluent gases from the chromatographic column are burned in a hydrogen flame. The high temperature of the flame thermally ionizes organic molecules present in the column effluent gas, and the resulting burst of ions and electrons momentarily increases the electrical conductivity of the flame. The increased flame conductivity allows additional current to flow in an external circuit in direct proportion to the number of organic molecules ionized in the flame.

The FID is responsive to all organic molecules, i.e., molecules containing C-H groups. For most applications this nonselective response is highly desirable because it insures that all the organic components in the sample mixture will be individually detected (assuming, of course that the column is capable of completely resolving the mixture). For certain applications, however, it is desirable to use a highly selective detector that is responsive to only a limited class of compounds. For example, in pesticide residue analysis the pesticide is usually present in trace amounts in a complex mixture of other materials. If the mixture is analyzed by gas chromatography using a nonselective detector, the response of the detector to the trace pesticide component may be completely obscured by the detector's response to the other materials in the mixture. Therefore, much effort has been expended in developing gas chromatography detectors that have a selective response to phosphorus and halogens, which are present in the molecules of many currently-used pesticides. Such a selective detector exhibits a preferential response to phosphorus and halogens, and thus permits trace quantities of pesticide to be detected in complex mixtures.

One type of selective detector that is now widely used in pesticide analysis is the so-called "thermionic" or "sodium" detector. Described by Karmen and Giuffrida in Nature, 201, 1204 (Mar. 21, 1964), and again by Karmen in Analytical Chemistry, 36, 1416 (July 1964), the thermionic detector consists of a modified FID having a wire coated with a sodium salt inserted into, and heated by, the hydrogen flame. When compounds containing phosphorus and/or halogen are burned in the hydrogen flame the products of combustion increase the rate of release of salt vapor from the heated wire. The salt vapor is thermally ionized, and the resulting burst of ions momentarily increases the electrical conductivity of the flame. The conductivity increase caused by the burning of compounds containing phosphorus or halogen is much greater than that caused by combustion of compounds not containing phosphorus or halogen. This is because only the phosphorus and halogen containing compounds give rise to the "sodium release effect." Consequently, the thermionic detector is highly sensitive to compounds containing phosphorus or halogen, and is much less sensitive to all other compounds. Although the original thermionic detector used a sodium salt as the ion source, it has since been found that other materials are equal to or better than sodium insofar as increasing the detector's sensitivity to compounds containing phosphorus or halogen. In particular, it has been found that salts of the alkali metals (lithium, sodium, potassium, ribidium, and cesium) and alkaline earth metals (calcium, strontium, and barium) are effective ion sources in a thermionic detector.

A serious disadvantage of conventional thermionic detectors is that the ion source consists of a thin wire or mesh that is coated with a metal salt. Repeated expansions and contractions of the wire (the hydrogen flame is alternately ignited and extinguished several times during the working day) cause the salt coating to flake off the wire in an uneven manner, thereby causing erratic detector response. Consequently, the wire must be frequently recoated to insure a reproducible response. The operating time before recoating is required may be only a few days. Also, because of the flaking of the salt coating, such conventional detectors display a constantly decreasing sensitivity, and several hours of equilibration are required before use.

The present invention provides an improved thermionic detector incorporating a novel ion source. The ion source is designed so as to avoid the instability problems that are inherent in conventional sources of the coated-wire type. The present ion source consists of a mixture of a metal salt and an inorganic binder which is formed into a solid block having a flow passage extending therethrough. The salt block is placed on the flame jet of a conventional FID so that the flow passage in the block lines up with the hydrogen passage in the FID. The hydrogen gas is ignited as it emerges, and burns at the upper surface of the block.

One of the advantages of the present detector, as compared to detectors using conventional coated-wire ion sources, is that the salt block is a homogeneous mixture having a single coefficient of thermal expansion. Consequently, the heated block expands uniformly with minimum thermal stress. This is in direct contrast to conventional coated-wire ion sources wherein the substrate wire and the overlying coating expand and contract at different rates. This differential expansion is the main cause of flaking and spalling of the salt coating from the wire, and hence of erratic detector response. In contrast, the uniform expansion of the present solid block ion source greatly extends its useful life and stabilizes the detector response. A typical detector using a solid block ion source may be operated for 400 hours with no loss in sensitivity. This can be contrasted to a typical operating time of only 50 hours for a conventional thermionic detector.

A further advantage of the present invention is that the quantity of salt vapor introduced into the hydrogen flame is reproducibly determined by the dimensions of the salt block, i.e., the hydrogen flame is in contact with a known constant area of the salt block. Furthermore, the dimensions of the block are accurately reproducible. By contrast, in a conventional coated-wire ion source, the vaporization of the outer layer of the coating continuously decreases the surface area exposed to the flame, and hence decreases the quantity of salt vapor introduced into the flame. In addition, coated-wire sources are prepared by repeatedly dipping a wire in the desired salt solution and then drying the coating. The weight of salt solution deposited on the wire depends on many factors such as temperature, surface tension of solution, cleanliness of wire, etc. As a result, the thickness of the deposited coating may vary within wide limits and is not reproducible. These problems of erratic response and lack of reproducibility are overcome in the present detector because of the inherent dimensional stability, long life, and reproducibility of the solid block ion source.

The invention will be described with reference to the accompanying drawings, of which:

FIG. 1 is a cross-sectional view of an improved thermionic detector incorporating a solid block ion source, FIG. 2 is an enlarged view of the ion source shown in FIG. 1, FIG. 3 is a dual-trace chromatogram comparing the response of a conventional flame ionization detector with that of the present improved thermionic detector, and FIG. 4 is a graphical plot of detector response as a function of sample weight.

Referring now to FIG. 1, there is shown a detector base 11 surmounted by a cylindrical housing shell 12. The upper end of shell 12 is closed by a loose-fitting removable cover 13 which is held in place by friction prongs 14. The column effluent (a mixture of carrier gas and separated components in the gas phase) flows into the detector via an input fitting 16 and an input channel 17 which is drilled in detector base 11. Similarly, hydrogen and air flow into the detector via input fittings 18 and 19 and input channels 21 and 22, respectively. Channels 17 and 18 communicate with a central passage 23, and the resulting mixture of column effluent and hydrogen gas flows through passage 23 and thence through a flame jet 24 made of a refractory material such as quartz. Air input channel 22 terminates in an air diffuser 25 which serves to disperse the air jet and promote uniform air flow within housing 12. Jet 24 is centrally positioned within housing 12 by means of sealing rings 26 and a compression nut 27 which engages a threaded boss 28 formed on the upper surface of base 11. A solid block ion source 29, having a central bore 31, is disposed on top of flame jet 24 such that bore 31 forms a continuation of central passage 23 in the detector base. A mixture of column effluent and hydrogen flows up through passage 23, thence through flame jet 24, and emerges from bore 31 where it is ignited by an incandescent ignition coil 32. Electrical current to coil 32 is supplied by leads 33 which are connected to an external power supply. Coil 32 is located off the central axis (behind the plane of the figure) of bore 31 so that the coil is not directly within the flame during detector operation. In addition, ignition current is supplied to coil 32 only at the instant the flame is ignited, and not during detector operation. This is done by providing a pushbutton contact in the power supply connection to leads 33. A cylindrical electrode sleeve 34 is coaxially positioned around ion source 29 and leads 33. Sleeve 34 is electrically connected to external circuitry by means of a feed-through connector 36. Similarly, leads 33 are connected to external circuitry by feed-through connector 37. A polarizing voltage is applied to lead 33 and electrode 34 by an external power supply 38 (this same power supply also furnishes ignition current to coil 32, but this connection is not shown). The power supply connection to lead 33 is shown schematically for clarity; actual connection is to connector 37 projecting behind the plane of the figure. In normal operation lead 33 is biased negatively at 100 to 200 volts with respect to electrode 34 which is held close to ground potential.

After the gas mixture is ignited by coil 32 the resulting flame burns at the tip of ion source 29. The heat of the flame continuously vaporizes salt molecules from the upper surface of the ion source. These vaporized salt molecules are, in turn, thermally ionized in the flame, thereby forming a cloud of ions (positive and negative) and electrons in the interelectrode space between leads 33 and electrode 34. The resulting increase in the electrical conductivity of the interelectrode space permits a small current to flow in the external power supply circuit. This background current is opposed or "bucked" by a bucking voltage source 39 so that the background current is effectively nulled out. Thus, when the column effluent consists of pure carrier gas (no separated components emerging from the chromatograph column) no current flows in the external circuit. When the column effluent consists of carrier gas plus a hydrocarbon component, that portion of the flame's thermal energy required to burn the hydrocarbon is not available to ionize salt molecules from the ion source. Consequently, the bucking current is slightly greater than the background current, and a small reverse current flows in the external circuit. However, when a compound containing halogen or phosphorus is burned in the flame the products of combustion greatly increase the rate at which salt molecules are released from the ion source (the exact mechanism of this release effect is unknown). The resulting increase in electrical conductivity of the interelectrode space permits a relatively large current (larger than the background current) to flow in the external circuit. This signal current is applied to the input of an electrometer amplifier 41 whose output is connected, through an attenuator 42, to a recording device 43 such as a strip chart recorder. A range switch 44, which may consist of a bank of selectable feedback resistors, is connected in parallel with amplifier 41 to maintain the amplifier output voltage within a preselected range. The design of electrometer amplifiers and other electronic devices used in conjunction with flame ionization detectors has been widely discussed in the gas chromatography literature (see, for example, Littlewood, "Gas Chromatography," pages 289–292, Academic Press, 1962), and the preceding discussion of the detector's auxiliary electronic apparatus is intended merely to be illustrative of current practice in the field.

As mentioned previously, the improved stability and performance of the present detector is attributable to the use of an ion source comprising a homogeneous pressed block of an easily ionized salt. An enlarged view of a preferred embodiment of the novel ion source is shown in FIG. 2. In this preferred configuration, the ion source comprises a thick-walled cylinder 29 having a central bore 31 which terminates in a tapered section 46. As shown in FIG. 1, the ion source is positioned on the tapered tip of jet 24 so that bore 31 is aligned with passage 23 in the detector base. Before positioning of the ion source, a thin coating of an inert viscous grease, such as Dow–11 (manufactured by Dow Chemical Co., Midland, Mich.), is applied to tapered section 46 so that a gas-tight seal is made with the tapered tip of jet 24. The dimensions of the ion source are not critical as long as enough surface area is exposed to the flame to provide the output current required by the external electronics. A typical ion source constructed according to FIG. 2 has an outside diameter of 0.25 inches, bore 31 has a diameter of 0.040 inch, the overall height of the block is 0.375 inch, and tapered section 46 has an included angle of 60°. It will be understood that these dimensions are merely illustrative and are not intended to limit the ion source configuration in any way. In addition, although source 29 is shown as a circular cylinder in both FIGS. 1 and 2, other configurations will work equally as well. For example, the salt block could be formed as a cylinder having an elliptical cross-section, as a truncated cone, or as a prism. Further, multiple bores 31 could be provided so that more than one flame would burn in contact with the ion source.

As previously mentioned, various salts of the alkali and alkaline earth metals may be used as ion sources for a thermionic detector. Cesium bromide was selected as the preferred ion source for the present detector because it provided a higher output signal than any of the other salts tested. At first, pure cesium bromide was cold-pressed to form a solid block, but it was found that the heat of the hydrogen flame tended to melt the salt and fuse bore 31 at the upper surface of the block. Various refractory fillers were mixed with the cesium bromide to remedy this problem, and it was found that fine silica powder provided the best protection against melting of the block and plugging of bore 31. In particular, "Cab-O-Sil 5M"

(Cabot Co., Boston, Mass.) was selected as the preferred refractory filler for mixing with the cesium bromide. It was also found that the weight ratio of Cab-O-Sil to cesium bromide was fairly critical. More than 5% Cab-O-Sil produced crumbling and disintegration of the pressed block. Less than 2% Cab-O-Sil did not provide protection against melting of the block and plugging of bore 31. The optimum range is about 2 to 3% Cab-O-Sil, and a mixture which produces consistently good results is 97.5% cesium bromide plus 2.5% Cab-O-Sil 5M. At present, solid block ion sources are being produced by the following procedure. A mixture of 97.5% cesium bromide and 2.5% Cab-O-Sil 5M is weighed out and then ground in a mortar to homogenize the mixture. The mixture is then moistened with acetone to agglomerate the finer particles, dried at 200° C. for 12 to 14 hours, and compacted at room temperature at a pressure of 5 to 10 tons. The pressing time is not critical, and satisfactory salt blocks may be mass produced in a punch press wherein the average pressing time is only about 0.1 second. The pressed salt blocks are finished by drilling out bore 31, a typical bore diameter being 0.040 inch, and countersinking tapered section 46. It is important to keep the salt mixture free of contamination during the mixing and pressing operations to prevent spurious signals from being generated when the contaminant is burned in the detector flame.

The present detector is responsive to both phosphorus and halogen, however the relative response ($R_{phos}/R_{hal}$) is a function of the air and hydrogen input flow rates. Thus, for example, by proper adjustment of these flow rates the relative response to phosphorus may be maximized so that the detector is virtually insensitive to halogen. Any residual output signal due to halogen may be canceled by appropriate adjustment of the attenuator control in the external electronic circuit. The effect of maximizing the detector's response to phosphorus is indicated by the dual-trace chromatogram shown in FIG. 3. A mixture of lindane, aldrin (both chlorinated pesticides), parathion (a phosphorus-containing pesticide), and n-docosane (a hydrocarbon) was dissolved in benzene and an aliquot sample injected into a gas chromatograph. The column effluent was divided into two streams; one stream going to a conventional flame ionization detector (upper trace in FIG. 3), and the other stream to the present detector wherein flow rates were optimized for maximum phosphorus response (lower trace in FIG. 3). The chromatographic peaks are numbered for identification as follows: (1) benzene solvent; (2) lindane (66 nanograms); (3) aldrin (92 nanograms) and parathion (30 nanograms) not separated; (4, 5, 6) hydrocarbon impurities in docosane; (7) n-docosane (1800 nanograms); (8) benzene solvent; (9) organophosphorus impurity in parathion; (10) parathion (30 nanograms) (11) n-docosane (negative response for 1800 nanograms). The operating conditions under which the FIG. 3 traces were obtained are given in the following table:

OPERATING CONDITIONS

Chromatograph—Model 1520B, Varian Aerograph, Walnut Creek, Calif.
Column—5 feet x ⅛ inch glass tube packed with 5% Dow-200 (Dow Chemical Co., Midland, Mich.) on Aeropak 100/120 mesh (Varian Aerograph, Walnut Creek, Calif.).
Column temp.—205° C.
Detector temp.—210° C.
Injector temp.—225° C.
Carrier gas (nitrogen) flow rate—20 ml./min.
Hydrogen flow rate—20 ml./min. (FID); 45 ml./min. (phos. detector).
Air flow rate—280 ml./min. (FID); 115 ml./min. (phos. detector).

FIG. 3 shows that the optimized "phosphorus detector" is responsive solely to the phosphorus-containing parathion (peak 10) and an organophosphorus impurity (peak 9). The benzene solvent response (peak 8) is actually an injection pressure effect (caused by rapid vaporization of a relatively large volume of solvent) rather than a true detector response. The small negative response for docosane (peak 11) could have been eliminated by adjustment of the air and hydrogen flow rates, but this would have caused a slight decrease in the detector's sensitivity to phosphorus. It should be particularly noted that the chlorine-containing lindane (peak 2) which shows clearly in the upper trace is missing in the lower "phosphorus detector" trace. In addition, the expected response for 30 nanograms of parathion (peak 10) was obtained with no interference from the chlorine-containing aldrin (peak 3) which eluted from the column at the same time.

The proper performance of the present detector requires close regulation of the hydrogen and air flow rates. This is apparent from the fact that the temperature and size of the flame are both sensitive functions of the hydrogen and air flow rates. Optimum flow rates for a detector constructed according to FIGS. 1 and 2 are as follows: air—100 to 200±1 ml./minute; hydrogen—5 to 50±0.1 ml./minute. It will be understood that these values are merely illustrative for a detector having particular dimensions, e.g., bore 31=0.040 inch in diameter, and are not intended to limit the range of flow rates to be used with detectors having different dimensions. Also, as previously noted, the relative response of the detector ($R_{phos}/R_{hal}$) is variable within the optimum flow range. Thus, maximum phosphorus response is obtained with a hydrogen flow of 13 to 18 ml./minute, whereas maximum halogen response is obtained with a hydrogen flow of 6 ml./minute. The preceding hydrogen flow rates were both measured at a fixed air flow rate of 170 ml./minute.

One of the requirements of a chromatographic detector used for quantitative work is that the detector response be a linear function of the sample weight. In addition, it is desirable that this linear relation extend over a wide range of sample weight; this range is called the "linear dynamic range" of the detector. FIG. 4 shows a log-log plot of detector response as a function of sample weight. The sample is parathion (structural formula shown in inset), and the detector response is plotted as a recorder peak height in terms of percent of full scale deflection (full scale=$4 \times 10^{-10}$ amperes detector output current). Thus, for example, a reading of 10 on the ordinate corresponds to 10% of full scale or $4 \times 10^{-11}$ amperes. FIG. 4 shows that the detector response to parathion is linear over a sample weight range of 0.012 nanogram (12 picograms) to about 20 nanograms, corresponding to a linear dynamic range of 1700, i.e., 20/.012. The minimum detectable sample weight is usually defined in gas chromatography as that weight of sample which gives a detector response equal to twice the background noise level. The recorder background noise level in FIG. 4 is indicated as 1.5% of full scale. Therefore, the minimum detectable weight of parathion is that quantity which gives a detector response equal to 3% ($2 \times 1.5\%$) of full scale. FIG. 4 shows the minimum detectable amount of parathion to be 0.012 nanogram (12 picograms). It was found that a tight seal of housing 12 to detector base 11 (see FIG. 1) was necessary to obtain the 12 picogram detectability for parathion. If the housing was only loosely fitted around the detector base, the minimum parathion detectability increased to 50 picograms. This effect is attributable to turbulence within the detector caused by air currents drawn in through the space between housing 12 and base 11. Therefore, for optimum performance, it is necessary to provide either a tight metal-to-metal seal or else an O-ring type seal between the housing and the detector base.

Although the present invention has been described with particular reference to a detector having a selective response to phosphorus and halogen, it is not intended to limit the invention to this particular embodiment. In its broadest scope the invention comprises a modified flame ionization detector wherein a homogeneous compacted ion source is heated in the flame, the emission rate of ions being responsive to the chemical nature of the components entering the detector. Thus, instead of a compacted block of an alkali metal salt, which gives a detector selective for phosphorus and halogens, the ion source could be fabricated from some other ion or electron emitting material, e.g., thorium oxide, which would give a detector selective for some other class of compounds. It is conceivable that one could have a detector whose response could be "tuned" for any desired class of compounds merely by installing the appropriate ion source. It is intended that the present invention embrace all such detectors wherein the ion source consists of a homogeneous self-supporting body, as distinguished from the wire or mesh-supported coatings of the prior art.

What is claimed is:
1. A chromatographic detector, comprising in combination:
   (a) electrode means for defining an interelectrode space,
   (b) means for defining a flowpath for effluent gas emerging from a chromatographic column,
   (c) means for mixing said effluent gas with a combustible gas to form a compustible gas mixture, said mixing means also defining a flow path for the gas mixture,
   (d) a homogeneous solid salt block forming an ion source, said block having at least one flow passage therein, said ion source being positioned in the flow path of said combustible gas mixture such that the mixture flows through the flow passage in said ion source,
   (e) means for igniting said combustible gas mixture at the point where it emerges from the ion source, whereby the heat of the resulting flame ionizes material from the surface of the ion source and introduces charged particles into said interelectrode space,
   (f) means for causing an electrical current to flow across said interelectrode space, and
   (g) means for measuring the magnitude of said electrical current.
2. A detector according to claim 1, wherein the ion source includes a salt of a metal selected from the group consisting of alkali and alkaline earth metals.
3. A detector according to claim 1, wherein the ion source includes a refractory binder material.
4. A detector according to claim 1, wherein the ion source is fabricated from a mixture of 95 to 98% cesium bromide and 2 to 5% silica.
5. A detector according to claim 1, wherein the ion source is a compacted circular cylinder having an axial bore extending therethrough.
6. A chromatographic detector, comprising in combination:
   (a) a base having flow passages therein for column effluent gas, hydrogen, and air, said effluent and hydrogen passages communicating with one another within said base,
   (b) an enclosed housing fixed to and surrounding said base,
   (c) an elongated cylindrical jet member having an axial bore therein, said jet member being positioned on said base such that the axial bore forms a continuation of the communicating column effluent and hydrogen passages within said base,
   (d) a cylindrical ion source positioned atop said jet member such that an axial flow passage within said ion source is aligned with the axial bore in said jet member, said ion source consisting of a compacted mixture of an alkali metal salt and a refractory binder material,
   (e) electrical ignition means for igniting a mixture of effluent and hydrogen gases emerging from said ion source,
   (f) a tubular electrode held in fixed coaxial relation with said ion source and said ignition means,
   (g) means for applying a polarizing voltage between said tubular electrode and said ignition means, thereby causing an electrical current to flow therebetween and
   (h) means for measuring the magnitude of said electrical current.

References Cited

UNITED STATES PATENTS 3,372,994   3/1968   Giuffrida.

OTHER REFERENCES

Karmen, A., et al.: Nature 201, 1204–5, Mar. 21, 1964.
Karmen, A., Anal. Chem. 36, No. 8, July 1964, pp. 1416–21.

MORRIS O. WOLK, *Primary Examiner.*

R. M. REESE, *Assistant Examiner.*

U.S. Cl. X.R.

23—232